March 17, 1931.  W. GANZ  1,796,517
LOCK
Filed June 15, 1927
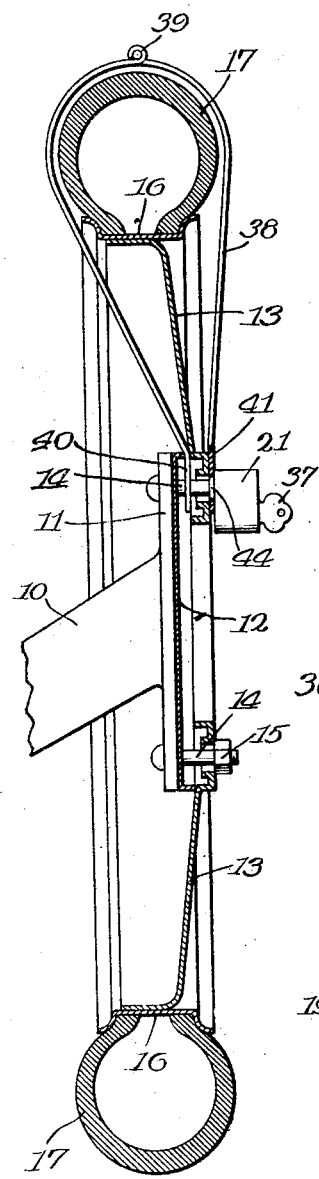
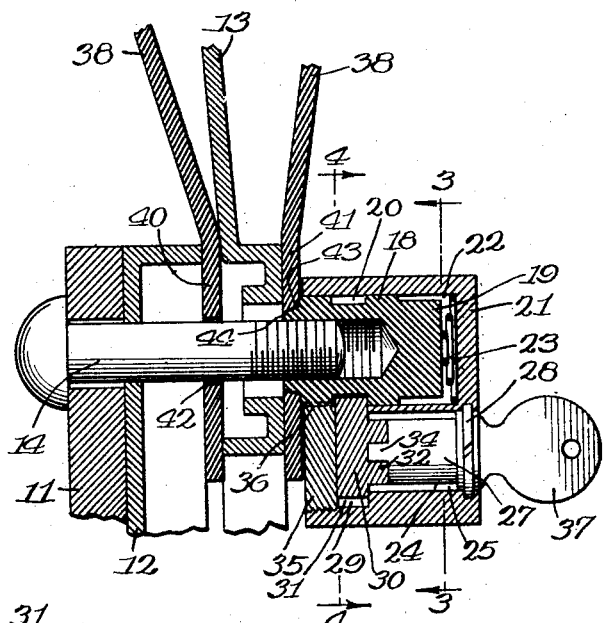
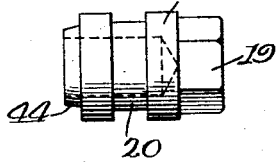
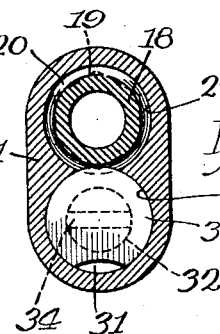
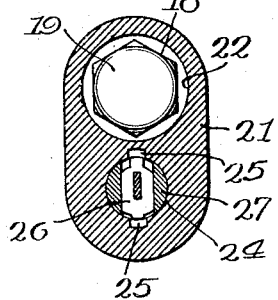
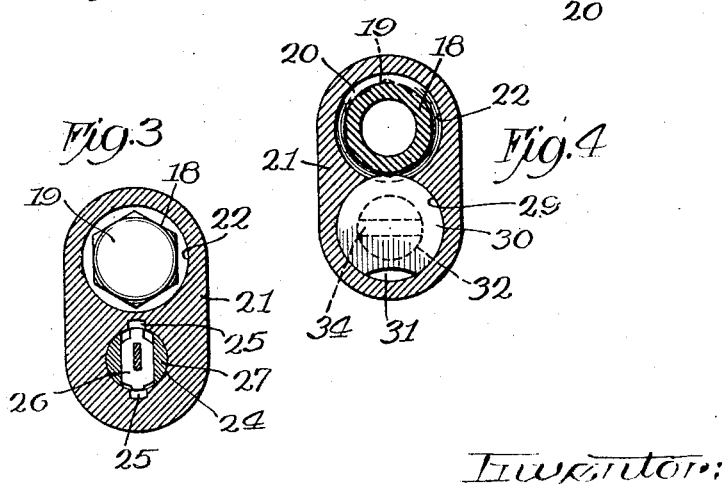
Inventor:
William Ganz
By Wilson, Mann & Cox
Attys.

Patented Mar. 17, 1931

1,796,517

UNITED STATES PATENT OFFICE

WILLIAM GANZ, OF CHICAGO, ILLINOIS

LOCK

Application filed June 15, 1927. Serial No. 198,995.

The principal object of this invention is to provide a simple lock fastening that will effectually prevent the theft of automobile accessories and the like and that may be produced at low cost.

A further object of the invention is to provide means that will not only prevent the theft of the spare wheel or tire rim, but will also prevent the theft of a tire from the spare wheel or rim.

For the purpose of illustration, a selected embodiment of the invention is illustrated in the accompanying drawings in which Fig. 1 is a vertical sectional view through a conventional bracket, spare wheel, rim and tire with the invention applied thereto;

Fig. 2 is an enlarged sectional view of a portion of Fig. 1 with the lock fastening shown in section;

Figs. 3 and 4 are sectional views taken on the lines 3—3 and 4—4 of Fig. 2, respectively;

Fig. 5 is a side elevation of a substitute nut for use in connection with this embodiment of the invention, and Fig. 6 is a perspective view of a rotor lock bolt for cooperating wtih the nut shown in Fig. 5.

Nothing in this illustration nor in the corresponding specific description is intended to require a narrow interpretation of the claims.

Referring to Figs. 1 and 2, 10 indicates a conventional bracket having a flange 11 equipped with a flanged disc 12 against which a conventional disc wheel body 13 is usually secured by a plurality of bolts 14 and nuts 15.

The wheel body is equipped with a conventional rim 16 carrying a conventional tire 17.

According to this embodiment of the invention one of the nuts 15 is discarded and replaced by a nut 18 (Fig. 5) having a wrench seat 19 at one end and a groove 20 on its periphery.

Cooperating with this nut is a shield including a casing 21 having a longitudinal bore 22 to receive the nut 18, and a spring 23 adapted to be compressed between the end of the nut and the bottom of the bore to prevent rattling.

The shield is also equipped with a bore 24 parallel to the bore 22 which is extended laterally at opposite sides by grooves 25 adapted to cooperate with tumblers 26 carried by a lock plug 27 rotatably mounted in the bore 24 and made fast within the shield by a split locking ring 28 fitted in corresponding grooves in the shield and the plug. Adjacent to the left end in Fig. 2 the bore 24 is enlarged, as indicated at 29, sufficient to intersect the bore 22 and form a mounting for a rotary bolt 30 which is in the form of a circular disk cut away, as indicated at 31, on an arc corresponding to the wall of the bore 22. At one side the bolt is fitted with a cylindrical stem 32 which is rotatably mounted in the bore 24 and a split at 33 to cooperate with a flattened rib 34 on the plug 27, whereby the bolt and plug are made to rotate in unison.

The end of the bore 29 is closed by a threaded disk 35, which is also cut away at 36 on an arc corresponding to the wall of the bore 22, so as not to interfere with the entry and withdrawal of the nut 20.

A key 37 controls the tumblers 26 and serves as a handle for rotating the plug 27 and with it the bolt 30.

When it is desired to lock the spare wheel or rim, or other device in place, the grooved nut 20 is applied to the bolt 14 and set up. The shield is then inserted and placed over the nut and the key 37 turned to set the bolt 30 in the position shown in Fig. 2 and then withdrawn when the tumblers 26 drop into the groove 25 and lock the plug and, hence, the bolt in that position. The shield can be freely rotated about the nut, but cannot be jammed against it so as to permit unscrewing the nut and, of course, a wrench cannot be applied to the nut, therefore, the device is securely locked until the key is inserted to turn the bolt to the reverse of that position, shown in Fig. 2, when the shield may be withdrawn and the nut removed in the usual manner.

In order to prevent the theft of a tire from the spare wheel or rim I provide, in addition to this lock device, or some other suitable lock device, a strap 38 preferably of steel, hinged at 39 and looped in a shape suited to the particular use, for extending around the rim and tire, and wheel body, as the case may be, substantially as indicated in Fig. 1. The end portions 40 and 41 of the strap are in this instance placed on opposite sides of the hub portion of the wheel body and perforated at 42 and 43 to receive one of the bolts 14, or a special bolt, as may be desired. When the conventional bolt is retained the perforation 43 should be enlarged and tapered, as shown in Fig. 2, and the nut 18 should be equipped with a conical extention 44 to give the nut an increased engagement with the threads of the bolt to compensate for the thickness of the strap.

It will be seen that while the strap is in place the tire cannot be removed from the rim, or the rim from the wheel. It will be obvious that the invention may be used in connection with various forms of spare rim and spare wheel carriers and a variety of other places where it is desired to lock a nut, and it will also be obvious that the lock fastening may be used in the absence of, and to take the place of, a nut on a stud or other projection where it is desired to securely make something fast.

I claim as my invention:

1. In a device of the class described, a nut having a circumferential shoulder, a shield having a pocket receiving the nut, a rotary bolt in the shield for making a swivel connection between the shield and the nut and being cut away at one side to release the nut and lock mechanism in the shield for controlling the position of the bolt.

2. In a device of the class described, a nut having a circumferential shoulder, a shield having a pocket receiving the nut, a rotary bolt in the shield for making a swivel connection between the shield and the nut and being cut away at one side to release the nut and lock mechanism in the shield for rotating the bolt.

3. In a device of the class described, a nut, a shield for the nut including two parallel bores one of which is adapted to receive the nut, a locking bolt in the other bore adapted in one position to make a swivel connection between the nut and the shield, and key operated means for operating said locking bolt.

4. In a device of the class described, a nut, a shield for the nut having one bore adapted to received the nut and another bore having an enlargement communicating with the first bore, a rotary bolt in the second bore cut away at one side to clear the nut and adapted to make a swivel connection between the nut and the shield or to sever its connection according to its position, and lock mechanism for controlling the position of the bolt.

5. In a device for use with a tire carrier for a spare wheel part including a bracket having a head provided with outwardly extending threaded bolts with nuts thereon for securing the flanged hub of a spare wheel to said bracket, a strap having one end provided with an opening for detachably engaging one of said bolts and adapted to extend outwardly and around the tread of the tire of said wheel and having its other end provided with an opening for detachably receiving said last-named bolt inwardly of the corresponding nut, and key operated locking means engaging a circumferential groove in said nut for preventing the unauthorized removal of the same, said means comprising a shield having a pair of openings therein, one of said openings receiving said last named nut, and the other having a rotating lock member therein for engaging said groove.

In testimony whereof I affix my signature.

WILLIAM GANZ.